US008448094B2

(12) United States Patent
Kipman et al.

(10) Patent No.: US 8,448,094 B2
(45) Date of Patent: May 21, 2013

(54) MAPPING A NATURAL INPUT DEVICE TO A LEGACY SYSTEM

(75) Inventors: Alex Kipman, Redmond, WA (US); R. Stephen Polzin, San Jose, CA (US); Kudo Tsunoda, Seattle, WA (US); Darren Bennett, Seattle, WA (US); Stephen Latta, Seattle, WA (US); Mark Finocchio, Redmond, WA (US); Gregory G. Snook, Sammamish, WA (US); Relja Markovic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 12/411,276

(22) Filed: Mar. 25, 2009

(65) Prior Publication Data

US 2010/0199229 A1 Aug. 5, 2010

Related U.S. Application Data

(60) Provisional application No. 61/148,902, filed on Jan. 30, 2009.

(51) Int. Cl.
*G60F 3/033* (2006.01)
*A60F 9/024* (2006.01)

(52) U.S. Cl.
USPC ............................... 715/863; 463/36; 463/39

(58) Field of Classification Search
USPC .................................. 345/156–184; 715/863
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

"Wired Blog Network", retrieved at <<http://blog.wired.com/gadgets/games/>>, Nov. 4, 2008, pp. 1-139.

(Continued)

*Primary Examiner* — Steven Sax
*Assistant Examiner* — Wilson Varga
(74) *Attorney, Agent, or Firm* — Alleman Hall McCoy Russell & Tuttle LLP (57) ABSTRACT

Systems and methods for mapping natural input devices to legacy system inputs are disclosed. One example system may include a computing device having an algorithmic preprocessing module configured to receive input data containing a natural user input and to identify the natural user input in the input data. The computing device may further include a gesture module coupled to the algorithmic preprocessing module, the gesture module being configured to associate the natural user input to a gesture in a gesture library. The computing device may also include a mapping module to map the gesture to a legacy controller input, and to send the legacy controller input to a legacy system in response to the natural user input.

19 Claims, 3 Drawing Sheets

U.S. PATENT DOCUMENTS

| | | |
|---|---|---|
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,982,352 A | 11/1999 | Pryor |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |

| | | | |
|---|---|---|---|
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2003/0156756 A1* | 8/2003 | Gokturk et al. | 382/190 |
| 2004/0046736 A1* | 3/2004 | Pryor et al. | 345/156 |
| 2006/0238490 A1* | 10/2006 | Stanley et al. | 345/156 |
| 2007/0110298 A1 | 5/2007 | Graepel et al. | |
| 2007/0250304 A1* | 10/2007 | Elfner et al. | 703/27 |
| 2008/0026838 A1 | 1/2008 | Dunstan et al. | |
| 2008/0084385 A1* | 4/2008 | Ranta et al. | 345/157 |
| 2008/0154573 A1* | 6/2008 | Jarrett et al. | 703/23 |
| 2008/0215974 A1 | 9/2008 | Harrison et al. | |
| 2008/0225041 A1* | 9/2008 | El Dokor et al. | 345/419 |
| 2008/0288878 A1* | 11/2008 | Hayashi et al. | 715/762 |
| 2009/0289892 A1* | 11/2009 | Cox et al. | 345/156 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2008014826 A1 | 2/2008 |

OTHER PUBLICATIONS

Naone, Erica., "Whole-Body Gaming", retrieved at <<http://www.technologyreview.com/computing/20717/>>, May 5, 2008, pp. 1-4.

Diaz, Jesus., "ZCam 3D Camera is Like Wii without Wiimote and Minority Report without Gloves", retrieved at <<http://www.gizmodo.com.au/2007/12/zcam_3d_camera_is_like_wii_wit.html>>, Dec. 16, 2007, pp. 1-3.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

MAPPING A NATURAL INPUT DEVICE TO A LEGACY SYSTEM

CROSS-REFERENCE TO RELATED APPLICATIONS

This application claims priority to U.S. Provisional Patent Application No. 61/148,902, filed Jan. 30, 2009, the entire contents of which are hereby incorporated herein by reference for all purposes.

BACKGROUND

Over the years, computer programs have come to feature increasingly feature-rich user interfaces, and new generations of user input devices have been designed to facilitate human-computer interaction with these user interfaces. New user input devices are often released to the marketplace along with computer programs that are designed to take advantage of new input mechanisms available on such user input devices. For example, a new user input device may be released to work with a new game program for a game console. One problem facing software developers is that a new user input device may not be backward compatible with prior computer programs. As a result, users may be forced to change user input devices to interact with the prior computer programs. This can be inconvenient to the user, and may be a barrier to adoption of the new user input device.

SUMMARY

Systems and methods for mapping natural input devices to legacy system inputs are disclosed. One example system may include a computing device having an algorithmic preprocessing module configured to receive input data containing a natural user input and to identify the natural user input in the input data. The computing device may further include a gesture module coupled to the algorithmic preprocessing module, the gesture module being configured to associate the natural user input to a gesture in a gesture library. The computing device may also include a mapping module to map the gesture to a legacy controller input, and to send the legacy controller input to a legacy system in response to the natural user input.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to mapping inputs from separately developed input devices to legacy input device commands. In an illustrative example, a legacy system may be coupled with a separately developed input device, such as a depth camera or other image capture device, which uses target recognition, analysis, and tracking. Depth information from the image capture device may then be interpreted as a natural user input and mapped to a legacy input, as described in the following description in more detail.

Figure 1:
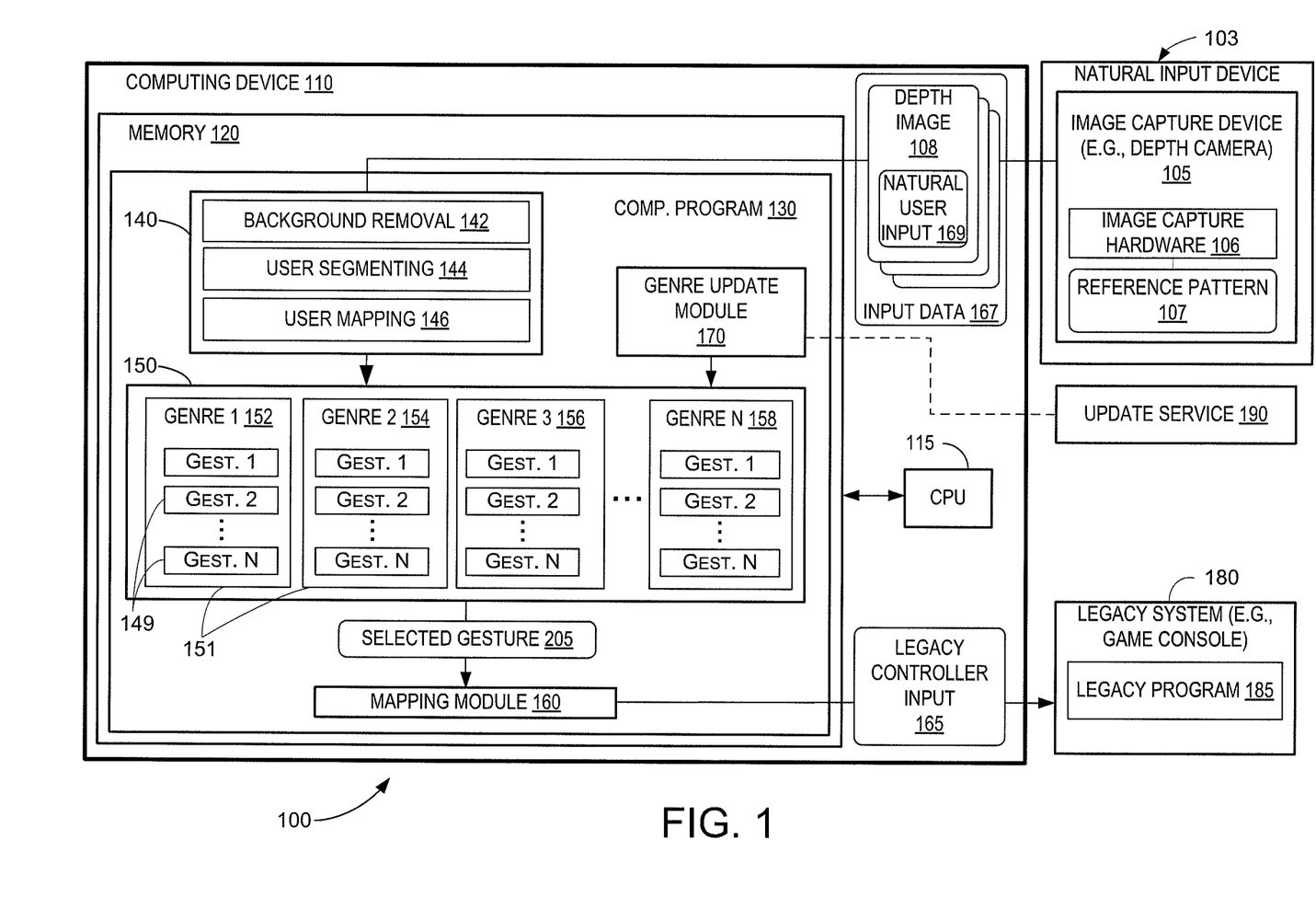
FIG. 1 shows an example of an embodiment of a system for mapping inputs from a natural input device to legacy system.

FIG. 1 shows an example of an embodiment of a system 100 including a computing device 110 with memory 120, a processor 115, and a computer program 130 for mapping inputs from a natural input device 103 to a legacy system 180 such as a game console or other computer system. In some embodiments, the computer program 130 can be stored in a volatile or non-volatile memory, run on an embedded processor, such as an application specific integrated circuit (ASIC), etc.

In the illustrated embodiment, computing device 110 is coupled with a natural input device 103 including an image capture device 105 such as a depth camera configured with image capture hardware 106. The image capture hardware 106 is configured to capture images of natural movements of a body or body part of a user, thereby giving rise to the term "natural input device". The input data 167 received from the natural input device 103 may be processed to identify natural user inputs 169 that reflect movements of the body or body parts of a user, as discussed below. In some embodiments, natural user inputs may also include vocal gestures, and gestures made with devices such a computer mice, and natural input devices may include devices configured to capture such natural user inputs.

In the depicted embodiment, computing device 110, natural input device 103 and legacy system 180 are illustrated as separate components, which may have separate housings and be connected by wired or wireless communication links. Alternatively, it will be appreciated that computing device 110, image capture device 105, and/or legacy system 180 may be housed in an integrated housing of one device containing the computing device 110, image capture device 105, and/or legacy system 180. Or, the natural input device 103 may be a peripheral device formed in a separate housing, and the computing device 110 and legacy system 180 may be formed in a common housing. Further, it may be possible to house the natural input device 103 in an integrated housing with the computing device 110, separate from the legacy system 180.

The image capture device 105 may include optics to illuminate a reference pattern 107 onto a field of view of lenses coupled with a CMOS sensor. In this way, the CMOS sensor may record the illuminated reference pattern 107 as a depth image 108 of raw input data. Computing device 110 may then process input data 167 received from the natural input device 103, to identify one or more natural user inputs 169, such as body or body part movements, etc., and then map the identified natural user inputs to a legacy controller input 165 that may be input to a legacy system. In this way, the natural input device 103 may be used to interact with a catalog of existing computer programs, referred to herein as legacy computer programs 185, which were designed to work with a legacy controller and which were not specifically designed to be compatible with the natural input device 103, without updates to the computer programs. The developer may thus leverage legacy computer programs 185 as well as new computer programs to promote adoption of the natural input device 103, and the user may leverage newly acquired skills at natural user inputs 169 using the natural input device with both new and legacy computer programs.

Mapping of natural user input 169 to legacy controller input 165 may be provided for virtually any suitable legacy program 185. Examples of legacy programs 185 for which mapping functionality may be provided include computer games configured to run on personal computers, game consoles, etc., general purpose operating system interfaces, application programs such as a word processor, email program, calendar program, spreadsheet program, Internet browser, media playback program, Computer Automated Design/Computer Automated Manufacturing applications, computer programs for public kiosks such as ATMs, ticket terminals, self-service point of sale terminals, etc., and computer programs for entertainment devices such as portable media players.

Referring to the embodiment depicted in FIG. 1, computing device 110 includes an algorithmic preprocessing module 140 configured to receive input data 167, wherein the input data 167 contains a natural user input 169 and a depth image 108 received from the image capture device 105. The depth image has depth values for objects in a field of view of the image capture device, and the natural user input 169 may be derived from the depth values in one or more depth images 108.

In one example, algorithmic preprocessing module 140 includes services such as a background removal service 142, user segmenting service 144, and user mapping service 146. The background removal service 142 is configured to remove background elements from the depth image, the user segmenting service 144 is in communication with the background removal service and is used to segment users of the legacy system, e.g., multiple players of a gaming system, within the depth image, and the user mapping service 146 is configured to map a skeleton to each segmented user. In the gaming context, the user segmenting service may be referred to as a player segmenting service, and the user mapping service may be referred to as a player mapping service. In response to a change of at least one skeleton, the algorithmic preprocessing module 140 associates the change with a gesture 149 in a selected gesture library 151 and identifies the natural user input 169 based on the gesture 149. Alternate embodiments may map other structures onto segmented players, and are not limited to a skeletal mapping system.

Upon receiving raw input data 167, algorithmic preprocessing module 140 processes the raw input data 167 to remove background elements in the raw input data 167, then segments one or more users from the remaining input data to identify natural user inputs 169 by mapping the one or more users and detecting changes in any of the one or more users position, depth, orientation, etc.

Computing device 110 also includes a gesture module 150 coupled to the algorithmic preprocessing module 140, wherein the gesture module is configured to associate a natural user input to a gesture 149 in a gesture library 151, as described above. For example, the gesture module 150 may be further configured to select a gesture library 151 from a plurality of gesture libraries 151 to interpret the natural user input 169, wherein each of the plurality of gesture libraries 151 corresponds to a respective genre of computer program. Additionally, a gesture library for a first computer program genre may include a set of generic gestures for inputs to each computer program in the first computer program genre.

In one example, the gesture libraries may correspond to different genres of computer games. Thus, the gesture libraries 151 may each include a set of gestures 149 for respective game genres. For example, a first person shooter game may include movements or gestures that would be common to multiple first person shooter games, and therefore a gesture library may be developed to efficiently map these gestures for any game in the genre.

In some embodiments, gestures 149 in the gesture libraries 151 are configurable. For example, although gesture libraries for various game genres may be developed, a game developer, a user, etc., may adjust gestures, add gestures, or delete gestures in the library in order to provide a customized user experience, increase game functionality, adjust dead zone calibrations, change control sensitivity, etc.

As shown in FIG. 1, computing device 110 includes a first genre 152, a second genre 154, a third genre 156, up through an Nth genre 158. The gesture module 150 may coordinate a natural user input 169 with a gesture 149 from a selected genre from among genres 152-158, which gesture may then be mapped to a legacy controller input and provided to a legacy program 185 executed on a legacy system 180. It will be appreciated that in some embodiments, the legacy program 185 may be executed on a system that is configured to run both new computer applications configured to receive input from the natural input device 103, and is also backward compatible to run legacy programs 185. Thus as used herein the term "legacy system" refers not only to systems designed exclusively for use with legacy programs 185, but also to systems that execute new computer programs and are backward compatible to execute legacy programs 185.

In some embodiments, computer program 130 may include a genre update module 170 configured to securely update a gesture library in the gesture module 150 by coupling to an update service 190, for example an update service running on a remote server and in communication through a network connection. For example, in addition to configurable genres, genre update module 170 may coordinate with legacy system 180, or other device, and in a trusted communication may receive updates to gestures, genres, gesture libraries, etc.

Computing device 110 also includes a mapping module 160 to map a gesture to a legacy controller input 165 and to send the legacy controller input 165 to a legacy system 180, in response to the natural user input identified in the depth image 108. The functions of the mapping module are described in further detail below with reference to FIG. 2.

In some embodiments, the image capture device 105 may send a depth image directly to the legacy system 180 allowing game developers or users to create new game content based on a raw depth image. Additionally, computing device 110 may receive the depth image 108 and map natural user inputs into legacy controller inputs 165 transparently to game developers, application programmers, etc.

Figure 2:
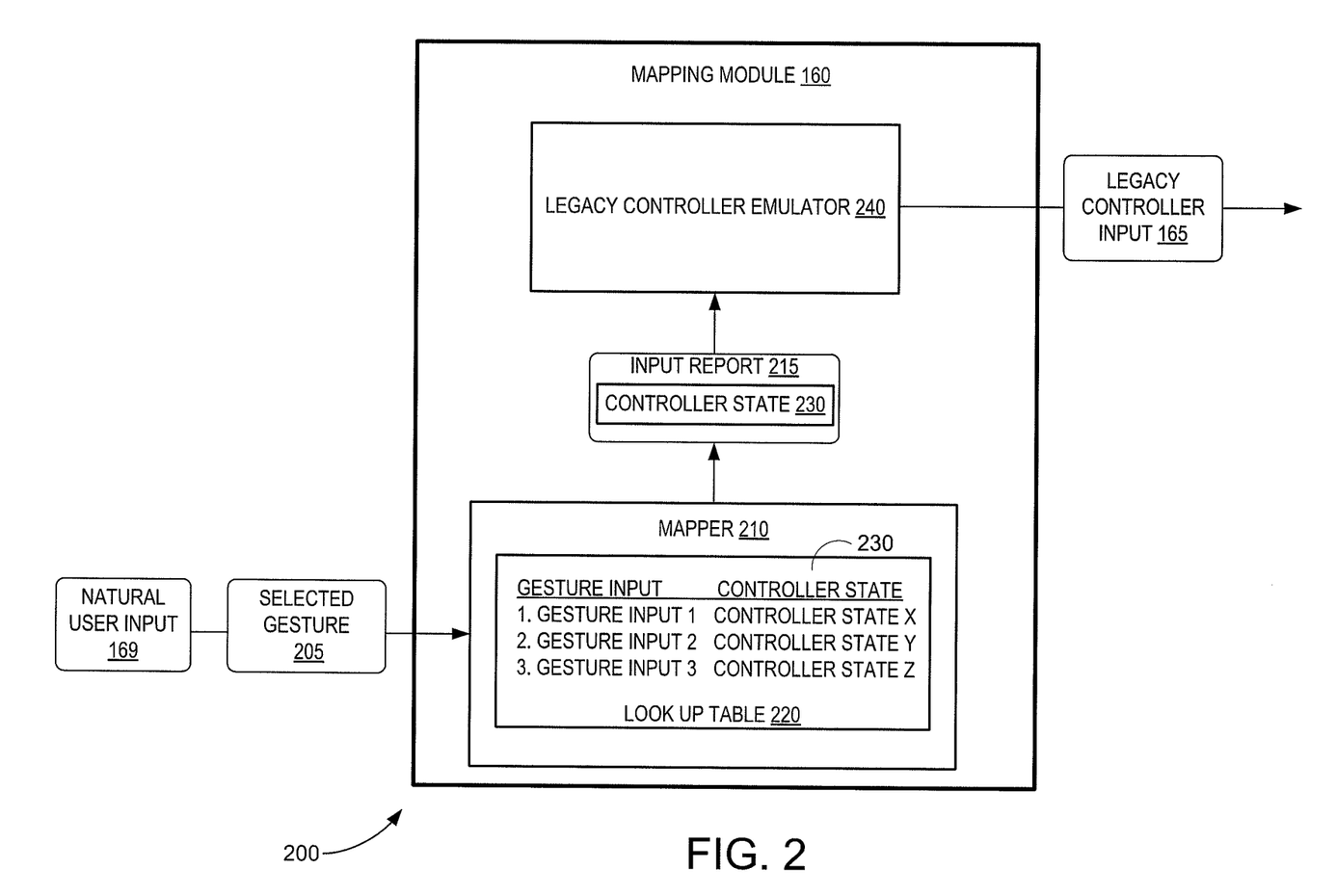
FIG. 2 shows an example mapping module that may be used in the embodiment system of FIG. 1.

Referring now to FIG. 2, mapping module 160 includes a mapper 210 that maps a natural user input 169 to a legacy controller input 165. The mapping module 160 may be configured to receive a gesture identifier corresponding to a selected gesture 205 from the gesture module, which has been associated with the natural user input 169. The mapper 210 is configured to map the selected gesture 205 to a legacy controller state 230 using a look up table 220 or other associative tool for linking a legacy controller state 230 to the selected gesture 205 from among a plurality of possible gesture inputs. Alternatively, the algorithmic preprocessing module may be configured to programmatically identify a gesture embodied in natural user input 169, and communicate the identified gesture directly to the mapper 210. In this embodiment, the mapper 210 may be configured to receive the gesture identifier directly from the algorithmic preprocessing module 140, rather than from the gesture module, and determine the associated legacy controller state 230.

Upon receiving the gesture identifier from the gesture module 150 or algorithmic preprocessing module 140, mapper 210 is configured to use look up table 220 to access a memory location associated with the gesture identifier and read an associated legacy controller state 230 from the memory location.

Once the legacy controller state is determined by the mapper 210, the mapper 210 is configured to forward an input report 215 containing the controller state 230 to a legacy controller emulator 240. Legacy controller emulator 240 in turn generates the legacy controller input 165, for output to the legacy system 180, in a form compatible with the legacy program 185 of the legacy system 180.

Emulator 240 is configured to receive the controller state 230 in input report 215 and emulate a legacy controller device for a legacy gaming system. In this way, natural user inputs 169 from natural input devices 103, and their corresponding selected gestures 205, may be mapped to a legacy controller state 230, converted to an emulated legacy controller input 165, and outputted to the legacy system 180.

The following example will help illustrate the functionality of the mapping module 160. Suppose that a gesture identifier is sent to the mapping module 160 that identifies a "user jump" as a selected gesture 205 for a player of a gaming system. The mapper 210 will then receive the gesture identifier for the "user jump", access the look up table 220, and determine that a "user jump" is associated with an "A" button press on a legacy game controller. Mapper 210 then associates the "A" button press as the legacy controller state for the selected gesture 205 identified by the gesture identifier, and mapper 210 forwards the controller state 230 in an input report 215 to emulator 240. Emulator 240 receives the controller state 230 and generates a legacy controller input 165 properly formatted to function with the legacy program 185 of the legacy system 180. In one example, the legacy controller may be a USB controller for a game console, and the legacy controller input 165 may be in the form of a USB input report for the game console.

Figure 3:
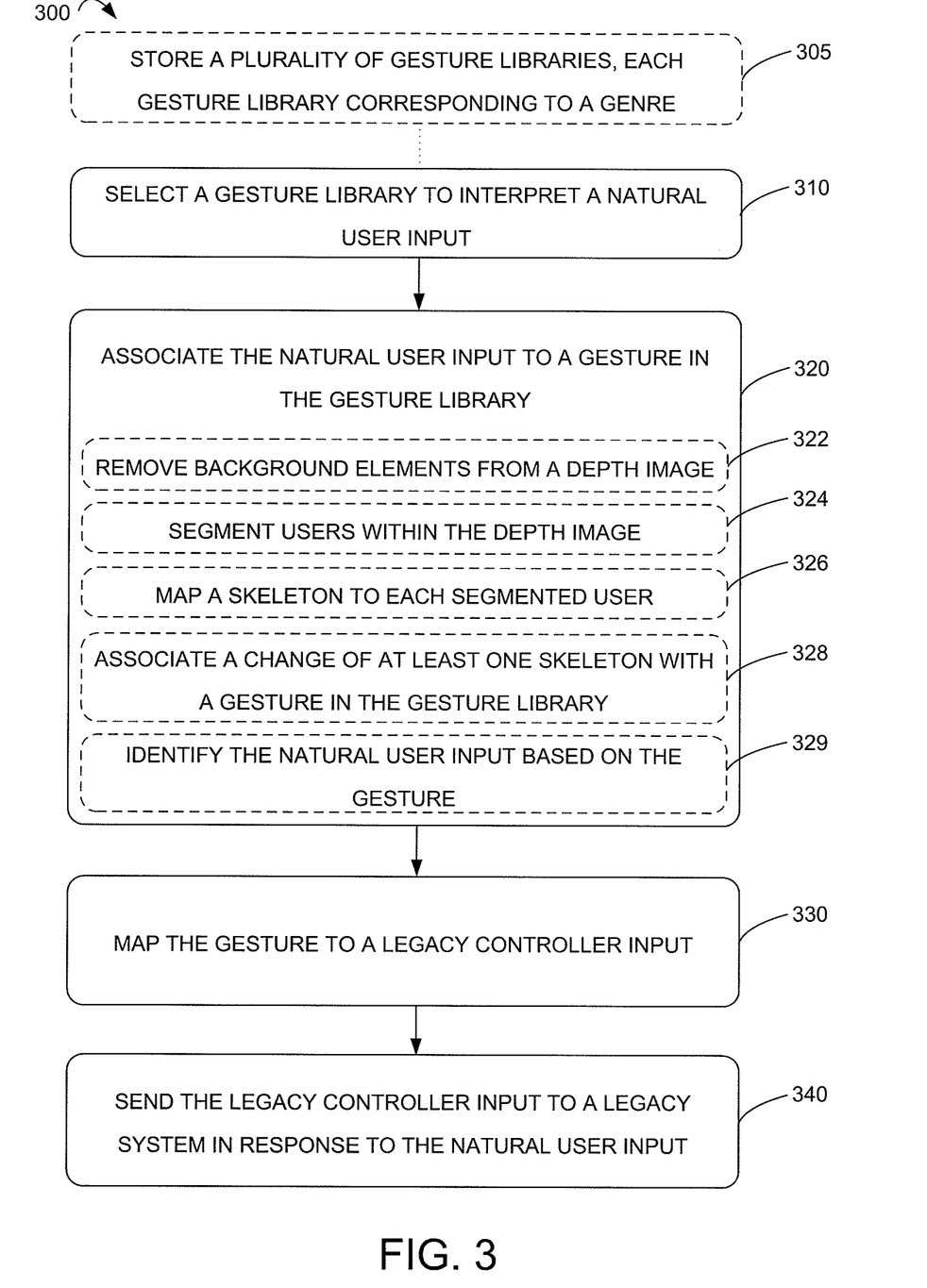
FIG. 3 shows a flow diagram of embodiments of a method for mapping inputs from a natural input device to legacy system.

Continuing with the figures, FIG. 3 shows a flow diagram of an embodiment of a method 300 for mapping a natural input device to a legacy controller input for a legacy system. As indicated in block 310, method 300 comprises selecting a gesture library to interpret a natural user input. As described above, the gesture library may be selected based on a detected genre of a legacy program running on the legacy system. For example, in an embodiment in which the legacy system is a legacy gaming system, a gesture module may query for a type of game genre and respond by selecting a gesture library according the type of game genre. Data indicating the game genre may be received from the legacy game system itself, by querying the game program, or may be derived from the input of a user. For example, the genre may be explicitly input by a user, or implicitly derived from an examination of user input during game play.

Some embodiments may include a step prior to block 310, for example, method 300 may include storing a plurality of gesture libraries with each gesture library corresponding to a genre as illustrated in block 305. Example genres include computer programs, games, word processors, spreadsheets, media players, Internet browsers, etc. In this way, a gesture library for a subject genre may be selected from the plurality of gesture libraries. For example, the computer program may be a computer game, and there may be a gesture library for a first person shooter genre, for a racing genre, for a party game genre, for a sports game genre, etc.

Method 300 also comprises associating the natural user input to a gesture in the gesture library, as indicated in block 320. As an example, in some embodiments, method 300 further comprises receiving a depth image from an image capture device such as a depth camera or other device. The depth image has depth values for objects in a field of view of the image capture device. The method may further include processing the depth image to identify the natural user input. For example, block 320 may further include processing the depth image to identify a natural user input may further comprise removing background elements from the depth image in block 322. In some embodiments, the depth image may be down sampled to a lower processing resolution before background elements are removed. Additionally, after the background is removed, high-variance or noisy depth values may be removed or smoothed, and missed or removed depth information may be filled or reconstructed. The method may further include segmenting players of the gaming system within the depth image as shown in block 324, mapping a skeleton to each segmented player as shown in block 326, associating a change of at least one skeleton with a gesture in the gesture library as depicted in block 328, and identifying the natural user input based on the gesture, as shown in block 329.

Method 300 also comprises mapping the gesture to a legacy controller input, as indicated at 330. As discussed above, a mapper of a mapping module may be employed to reference a look up table and determine a legacy controller state associated with the gesture, and a legacy controller emulator of the mapping module may be used to generate a legacy controller input for the legacy controller state.

Next, in block 340, method 300 comprises sending the legacy controller input to a legacy system in response to the natural user input. In an example, an embodiment may process natural user inputs into legacy controller inputs for a legacy gaming system, in turn allowing natural user inputs to be used with an existing catalog of games. Processing of input into legacy controller inputs for other types of legacy systems is also possible, as discussed above.

In some embodiments, a legacy controller input may be a first legacy controller input, wherein an embodiment method may further comprise adding a configurable gesture to the gesture library, mapping the configurable gesture to a second legacy controller input, and sending the second legacy controller input to a gaming system in response to the natural user input. Some embodiments may further comprise operating a legacy game on the gaming system, and providing the legacy controller input to the legacy game in response to the natural user input.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, a natural input device that may be in communication with a game console.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for using a natural input device to control a legacy gaming system, the method comprising:
   receiving a natural user input from the natural input device, the natural input device distinct from a legacy controller device of the legacy gaming system, the natural user input simulating a game motion that corresponds to a motion a legacy game input represents,
   wherein receiving the natural user input includes receiving a depth image from an image capture device including a depth camera;
   selecting a gesture library from a plurality of gesture libraries based on a legacy gaming program running on the legacy gaming system;
   associating the natural user input with a first gesture from the gesture library selected;
   mapping the associated first gesture to the corresponding input of the legacy controller device;
   sending the corresponding input to the legacy gaming system in response to receiving the natural user input; and
   adding a second gesture to a gesture library in the plurality of gesture libraries.

2. The method of claim 1, wherein mapping the first gesture to the corresponding input of the legacy controller device includes:
   mapping the first gesture to a legacy controller state using a look up table; and
   generating the corresponding input of the legacy controller device via a legacy controller emulator.

3. The method of claim 1, wherein the depth image includes depth values for objects in a field of view of the depth camera, the method further comprising processing the depth image to identify the natural user input.

4. The method of claim 3, wherein processing the depth image to identify the natural user input comprises:
   removing at least one background element from the depth image;
   segmenting at least one player of the legacy gaming system within the depth image;
   mapping a skeleton to the at least one segmented player;
   associating a change in the skeleton with the first gesture; and
   identifying the natural user input based on the first gesture.

5. The method of claim 4, wherein each of the plurality of gesture libraries corresponds to a different game genre.

6. The method of claim 1, wherein the corresponding input of the legacy controller device is a first corresponding input, the method further comprising:
   mapping the second gesture to a second corresponding input of the legacy controller device; and
   sending the second corresponding input to the legacy gaming system in response to receiving natural user input associated with the second gesture.

7. The method of claim 1 wherein the legacy gaming program is configured to work with the legacy controller device and not designed to be compatible with the natural input device.

8. A computing device for using a natural input device to control a legacy gaming system, the device comprising:
   an algorithmic preprocessing module configured to receive data from a natural input device distinct from a legacy controller device of the legacy gaming system, and to identify in the data a natural user input, the natural user input simulating a game motion that corresponds to a motion a legacy game input represents,
   wherein the data includes a depth image from an image capture device including a depth camera;
   a gesture module configured to select a gesture library from a plurality of gesture libraries based on a legacy gaming program running on the legacy gaming system, to associate the natural user input with a first gesture from the selected gesture library, and to add a second gesture to a gesture library in the plurality of gesture libraries;
   a mapping module configured to map the associated first gesture to the corresponding input of the legacy controller device, and to send the corresponding input to the legacy gaming system in response to receiving the natural user input.

9. The computing device of claim 8, wherein the mapping module includes:
   a mapper configured to map the first gesture to a legacy controller state using a look up table, and
   a legacy controller emulator configured to receive the legacy controller state from the mapper and to generate the corresponding input of the legacy controller device based on the legacy controller state.

10. The computing device of claim 8, wherein the depth image includes depth values for objects in a field of view of the image capture device.

11. The computing device of claim 9, wherein the algorithmic preprocessing module includes:
    a background removal service configured to remove at least one background element from the depth image;
    a player segmenting service in communication with the background removal service, the player segmenting service configured to segment at least one player of the legacy gaming system within the depth image;
    a player mapping service configured to map a skeleton to the at least one segmented player, wherein the algorithmic preprocessing module associates a change in the skeleton with the first gesture and identifies the natural user input based on the first gesture.

12. The computing device of claim 8, wherein each of the plurality of gesture libraries corresponds to a different computer program genre.

13. The computing device of claim 12, further comprising a genre update module configured to securely update one of the plurality of gesture libraries in the gesture module.

14. A computer-readable storage device containing instructions executable by a computing device to enable a natural input device to control a legacy gaming system, the instructions being executable to perform a method comprising:
    receiving a depth image from a depth camera of a natural input device distinct from a legacy controller device of the legacy gaming system, the depth image including depth values for objects in a field of view of the depth camera;
    processing the depth image to identify a natural user input, the natural user input simulating a game motion that corresponds to a motion a legacy game input represents;
    selecting a gesture library from a plurality of gesture libraries based on a legacy gaming program on the legacy gaming system;

associating the natural user input with a first gesture from the gesture library selected;

mapping the associated first gesture to the corresponding input of the legacy controller device;

sending the corresponding input of the legacy controller device to the legacy gaming system in response to receiving the natural user input; and adding a second gesture to a gesture library in the plurality of gesture libraries.

15. The computer-readable storage device of claim 14, wherein mapping the associated first gesture to the corresponding input of the legacy controller device includes:

mapping the first gesture to a legacy controller state using a look up table, and generating the corresponding input of the legacy controller via a legacy controller emulator.

16. The computer-readable storage device of claim 14, further comprising instructions executable for:

removing at least one background element from the depth image;

segmenting at least one player of the legacy gaming system within the depth image;

mapping a skeleton to the at least one segmented player;

associating a change in the skeleton with the first gesture; and identifying the natural user input based on the first gesture.

17. The computer-readable storage device of claim 14, wherein the corresponding input of the legacy controller device is a first corresponding input, the medium further comprising instructions executable for:

mapping the second gesture to a second corresponding input of the legacy controller device; and sending the second corresponding input to the legacy gaming system in response to receiving a natural user input associated with the second gesture.

18. The computer-readable storage device of claim 14, wherein each of the plurality of gesture libraries corresponds to a different game genre.

19. The computer-readable storage device of claim 14, further comprising instructions executable for:

operating a legacy game on the legacy gaming system; and providing the corresponding input of the legacy controller device to the legacy game in response to receiving the natural user input.

* * * * *